3,397,244
PROCESS FOR PRODUCTION OF DIARYL AND
DI(ALKARYL) SULFIDES
Rector P. Louthan, Bartlesville, Okla., assignor to Phillips
Petroleum Company, a corporation of Delaware
No Drawing. Filed Sept. 9, 1964, Ser. No. 395,292
12 Claims. (Cl. 260—609)

This invention relates to the production of diaryl sulfides, di(alkaryl) sulfidies and aryl alkaryl sulfides. In one of its aspects, the invention relates to the production of a diaryl or a di(alkaryl) sulfide by reacting an aryl halide or an alkaryl halide in a polar organic compound solvent at an elevated temperature with an alkali metal bisulfide. In another of its aspects, the invention relates to such a reaction wherein the reactants, alkali metal hydroxide and hydrogen sulfide which form the alkali metal bisulfide, are supplied to the reaction zone. In another of its aspects, the invention relates to the reaction of an aryl halide and/or alkaryl halide with an alkali metal bisulfide at an elevated temperature in a polar organic compound in a closed vessel under autogenous pressure. In a still further aspect of the invention, it relates to such a reaction as here described wherein, in preparation for the reaction, the alkali metal bisulfide is dissolved in the polar organic solvent at room temperature.

A wide variety of diaryl sulfide and di(alkaryl) sulfides are known, some of which have wide utility. However, the processes currently available for preparing these compounds are so tedious and expensive that the price of these compounds has remained relatively high, thus preventing real commercial development. For example, diphenyl sulfide has been prepared by the reaction of benzenediazonium chloride with the sodium mercaptide of thiophenol. Another method which has been used for the preparation of this compound is the pyrolysis of the lead mercaptide of thiophenol. Diaryl sulfides and di(alkaryl) sulfides are useful as intermediates for the preparation of insecticides, as plasticizers, high boiling solvents and the like.

These sulfides are useful as high boiling solvents, heat exchange fluids, hydraulic fluids, and as intermediates for the production of sulfoxides and sulfones which, themselves, have utility in such fields as insecticides and high boiling solvents. For example, diphenyl sulfide has a melting point of $-21.5°$ C. and a boiling point at atmospheric pressure $296°$ C. This wide fluid range, coupled with its very high boiling point, makes this compound particularly suitable for use as a heat transfer medium. Diphenyl sulfone, prepared by the peroxide oxidation of diphenyl sulfide, is useful as an insecticide. Physical properties of other diaryl sulfides and di(alkaryl) sulfides are given in "Organic Chemistry of Bivalent Sulfur," Reid, vol. 2, Chemical Publishing Company Incorporated, New York (1960), pages 117–123. A relatively simple, economical process for the preparation of these sulfides would find ready acceptance by the industry.

It is disclosed in copending application Serial No. 326,389 of H. W. Hill and James T. Edmonds, filed Nov. 27, 1963, now Patent 3,322,834, issued May 30, 1967, that diaryl sulfides and di(alkaryl) sulfides and aryl alkaryl sulfides can be prepared by the reaction of an aryl halide or alkaryl halide with an alkali metal sulfide in a polar organic reaction medium. In that process, a solution of an alkali metal sulfide, such as $Na_2S$, is formed in a polar organic solvent medium, such as N-methyl-2-pyrrolidone. These solutions set up to gelatinous masses at temperatures below $130°$ C. This makes such process steps as the charging of the reactor very difficult, and line plugging can be encountered.

I have now found that, by using an alkali metal bisulfide in lieu of or in addition to the alkali metal sulfide of said application, the tendency to produce gelatinous masses at temperatures below $130°$ C. is reduced or eliminated. Use of the bisulfide alone is now preferred.

The process of the present invention is applicable to the operation and materials disclosed or within the scope of said application for patent.

It is an object of this invention to provide a new and improved process for the production of diaryl sulfides and/or di(alkaryl) sulfides. It is a further object of this invention to provide a new process for the production of said sulfides in a one-step reaction, employing inexpensive starting materials. It is a further object of the invention to prepare the said sulfides in the substantial absence of water. It is a still further object of the invention to provide a process for the production of the said sulfides avoiding tedious and expensive operations heretofore required. It is a still further object of the invention to provide a new and improved process for the production of diaryl sulfides and/or di(alkaryl) sulfides and aryl alkaryl sulfides employing an alkali metal bisulfide which dissolves in the polar organic reaction medium employed at ordinary temperatures without forming a gelatinous mass.

Other aspects, objects and the several advantages of the invention are apparent from a study of this disclosure and the appended claims.

According to the present invention, there is provided a process for the production of at least one diaryl sulfide, di(alkaryl) sulfide, and/or aryl alkaryl sulfide by a reaction of aryl monohalide and/or alkaryl monohalide with an alkali metal bisulfide in a reaction medium consisting essentially of a polar organic compound, said polar organic compound being a substantial solvent for the reactants and being essentially stable at the reaction conditions which generally include an elevated temperature, the range of temperature presently considered applicable being from about $125°$ C. to about $450°$ C.

The reaction according to which the invention can be said to be effected is illustrated by the equation

wherein each R is selected from the group consisting of aryl and alkaryl radicals containing from 6 to 18 carbon atoms, inclusive, each X is a halogen selected from the group consisting of chlorine, bromine, fluorine and iodine, and M is an alkali metal selected from the group consisting of sodium, potassium, lithium, rubidium and cesium. At present, it is preferred that X be chlorine or bromine and M be sodium or potassium. Mixtures of reactants of any group can be used and are within the scope of the invention.

Some examples of compounds of the formula RX which can be employed as reactants in the process of this invention are:

chlorobenzene
4-chlorotoluene
bromobenzene
1-chloro-3-ethylbenzene
1-fluoro-3-isopropylbenzene
1-iodo-2-methyl-4-ethylbenzene
1-bromo-2,4-diethylbenzene
1-chloro-3,4,5,6-tetramethylbenzene
1-chloronaphthalene
4-chlorobiphenyl
2-bromobiphenyl
1-chloro-4-dodecylbenzene
1-bromo-2,4,6-tri-n-butylbenzene
4-bromo-p-terphenyl
6-n-octyl-1-chloronaphthalene and the like, including mixtures thereof.

The alkali metal bisulfides which are employed in the process of this invention are the bisulfides of sodium, potassium, lithium, rubidium and cesium. These bisulfides can be charged to the reaction zone as the bisulfide, or they can be formed directly in the reaction zone by the reaction of hydrogen sulfide with an alkali metal hydroxide, such as NaOH. Formation of the alkali metal bisulfide in situ by reaction of an alkali metal hydroxide and $H_2S$ is effected at a mol ratio generally not exceeding 1:1 $H_2S$:alkali metal hydroxide. Higher amounts of alkali metal hydroxide lead to formation of alkali metal sulfides. The formation of the alkali metal bisulfide in the reaction zone can be carried out in the presence or absence of an aryl halide or alkaryl halide of the formula RX.

Polar organic compounds which can be employed as reaction media in the process of this invention are those in which the aryl halides, alkaryl halides and the alkali metal hydroxide and hydrogen sulfide are used in lieu of the alkali metal bisulfide. Representative examples of suitable classes of compounds include amides, lactams, sulfones and the like. Specific examples of such compounds are N-methyl-2-pyrrolidone
pyrrolidone
caprolactam
N-ethylcaprolactam
sulfolane
dimethylacetamide
tetramethylurea
hexamethylphosphoramide
N,N'-ethylenedipyrrolidone and the like.

The process of this invention is carried out by contacting the above-defined reactants in at least one polar solvent at a temperature of from about 125° C. to about 450° C., preferably from 175° C. to 350° C. The mol ratios of RX reactant to MSH reactant will generally range from about 0.5:1 to about 5:1, and preferably will range from 1:1 to 3:1. Larger amounts of RX reactants can be employed, if desired, and unreacted RX compound can be recovered and recycled to the reaction zone. The pressure in the reaction zone will generally be autogenous, and, at the reaction temperature specified, this pressure can run as high as 1000 p.s.i. or greater, depending upon the chosen reactants and polar solvent. Reaction times will depend upon the chosen reaction temperature, and can range from 10 minutes to 50 hours. As in the case of most reactions, the longer reaction times will be required at the lower temperatures, and vice versa.

The amount of polar organic solvent present in the reaction zone can vary over a wide range, but will generally range from about 100 to 2500 ml. per mol of MSH reactant.

The reaction can be carried out batchwise or as a continuous operation. At the completion of the reaction, conventional techniques can be utilized for recovering the diaryl sulfides, di(alkaryl) sulfides, aryl alkaryl sulfides and/or mixtures thereof. At the completion of the reaction, the reaction mixture is generally cooled from the reaction temperature, filtered to remove alkali metal halide, and then treated by such processes as distillation, crystallization, extraction and the like for the recovery of the sulfide product.

As a further advantage of this invention, it has been discovered that alkali metal bisulfides are soluble in certain polar organic solvents at room temperature. For example, sodium bisulfide exhibits an inverse solubility in N-methyl-2-pyrrolidone. For example, a free-flowing solution of sodium bisulfide is obtained at room temperature with 1 mol of sodium bisulfide in 1 liter of N-methyl-2-pyrrolidone. Thus, if one prefers to form the sodium bisulfide or other alkali metal bisulfide outside of the reaction zone in which this compound is to be reacted with an aryl halide, it is relatively easy to charge such a free-flowing solution. This solubility at atmospheric temperatures simplifies the charging procedures and also eliminates the problem of line plugging encountered with solutions of alkali metal sulfides, such as $Na_2S$ in the same solvent, N-methyl-2-pyrrolidone.

It can be seen from the discussion and example herein that the process of this invention provides a relatively simple, economic process for the production of diaryl sulfides, di(alkaryl) sulfides, aryl alkaryl sulfides and/or mixtures thereof. Typical sulfides which can be prepared by the process of this invention include:

diphenyl sulfide
di(4-methylphenyl) sulfide
di(3-ethylphenyl) sulfide
di(2-methyl-4-isopropylphenyl) sulfide
di(2,4-diethylphenyl) sulfide
dinaphthyl sulfide
phenyl 4-methylphenyl sulfide
di(2-ethyl-4-n-decylphenyl) sulfide
phenyl naphthyl sulfide
di(4-biphenylyl) sulfide
di(4-[p,p'-terphenylyl]) sulfide
4-biphenylyl phenyl sulfide.

The following specific example is illustrative of the advantages of the process of the invention which is generally applicable as herein stated.

EXAMPLE

A run was carried out in which chlorobenzene and sodium bisulfide were reacted in N-methyl-2-pyrrolidone to form diphenyl sulfide according to the process of this invention.

In this run, $H_2S$ gas in excess of 2.0 mols was passed slowly into a stirred slurry of NaOH (2.0 mols) in 2200 ml. of N-methyl-2-pyrrolidone while heating slowly to reflux. The heating was continued until all of the sodium hydroxide pellets had disappeared. During this heating, about 250 ml. of water and N-methyl-2-pyrrolidone were taken overhead. After the first 35 ml. came overhead, a white solid began to precipitate. The slurry of the white solid in N-methyl-2-pyrrolidone was allowed to stand overnight at room temperature, and the next morning it was noted that all of the solid had gone into solution. On heating to 120° C., the solid began to precipitate again, but redissolved on cooling. The cooled solution which was essentially anhydrous since it had been freed of water, was charged to a 1-gallon, stirred stainless steel autoclave, and heated to 260° C. Two mols of chlorobenzene were then pumped into the autoclave over about a 40-minute period, and the material in the reactor was maintained at 260° C. for 2 hours and then heated at 300° C. for 2 additional hours.

Following the reaction time, the reactor contents were cooled, diluted with about 4 liters of water and extracted with about 2 liters of ether. After separating the phases, the ether extract phase was washed with water and heated to 80° C. to strip off the ether. The remaining material was then distilled to obtain a 96 mol percent ultimate yield of diphenyl sulfide, based on a 90.2 percent conversion of the chlorobenzene in this run.

The procedure above exemplified, using chlorobenzene, hydrogen sulfide, and sodium hydroxide, will yield analogous results when the other alkali metal bisulfides and halogenated compounds as herein disclosed are employed. The example shows that, when the slurry of white solid in N-methyl-2-pyrrolidone was allowed to stand over night at room temperature, it disappeared into solution. Further, that on heating the solid began again to precipitate. This solid was, of course, the sodium bisulfide which had been produced by the reaction of the hydrogen sulfide with the sodium hydroxide in the N-methyl-2-pyrrolidone.

Reasonable variation and modification are possible within the scope of the foregoing disclosure and the appended claims to the invention the essence of which is that a process for the preparation of at least one of a diaryl sulfide, a di(alkaryl) sulfide and an aryl alkyaryl sulfide has been provided, the process comprising reacting at least one of an aryl halide and an alkyaryl halide with an alkali metal bisulfide in a polar organic compound reaction medium at an elevated temperature, the alkali metal bisulfide being supplied, as such, to the reaction zone dissolved in the solvent or prepared in situ by a reaction substantially as set forth and herein described.

I claim:

1. A process for the preparation of at least one of a diaryl sulfide, a di(alkyaryl) sulfide and an aryl alkyaryl sulfide by reacting at an elevated temperature at least one of an aryl halide and an alkaryl halide with an alkali metal bisulfide in a polar organic compound reaction medium which is a substantial solvent for the reactants and which is essentially stable at the reaction conditions and then recovering a sulfide thus formed from the reaction mass thus obtained, said reaction medium being selected from N-methyl-2-pyrrolidone
pyrrolidone
caprolactam
N-ethylcaprolactam
sulfolane
dimethylacetamide
tetramethylurea
hexamethylphosphoramide
N,N′-ethylenedipyrrolidone the ratio of said halide to said bisulfide being in the approximate range 0.5:1–5:1.

2. A process for the production of at least one of a diaryl sulfide, a di(alkaryl) sulfide and an aryl alkaryl sulfide by reacting at an elevated temperature at least one of an aryl halide and an alkaryl halide and alkali metal bisulfide in a reaction medium comprising a polar organic compound which is a substantial solvent for the reactants and which is stable at the reaction conditions and then recovering the sulfide thus formed from the reaction mass thus obtained, said reaction medium being selected from N-methyl-2-pyrrolidone
pyrrolidone
caprolactam
N-ethylcaprolactam
sulfolane
dimethylacetamide
tetramethylurea
hexamethylphosphoramide
N,N′-ethylenedipyrrolidone the ratio of said halide to said bisulfide being in the approximate range 1:1–3:1.

3. A process for the preparation of at least one of a diaryl sulfide, a di(alkaryl) sulfide, and an aryl alkaryl sulfide by reacting at least one of an aryl halide and an alkaryl halide with an alkali meta bisulfide in a reaction medium comprising a polar organic compound which is a substantial solvent for the reactants and which is stable at the reaction conditions which include an elevated temperature, the reaction taking place being as follows:

$$2RX + 2MSH \rightarrow R{-}S{-}R + 2MX + H_2S$$

wherein each R is a member selected from the group consisting of aryl and alkaryl radicals containing from 6 to 18 carbon atoms, inclusive, X is a halogen selected from the group consisting of chlorine, bromine, fluorine and iodine, and M is an alkali metal selected from the group consisting of sodium, potassium, lithium, rubidium and cesium, said reaction medium being selected from N-methyl-2-pyrrolidone
pyrrolidone
caprolactam
N-ethylcaprolactam
sulfolane
dimethylacetamide
tetramethylurea
hexamethylphosphoramide
N,N′-ethylenedipyrrolidone the ratio of said halide to said bisulfide being in the approximate range of 0.5:1–5:1.

4. A process according to claim 3 wherein the solvent is N-methyl-2-pyrrolidone and the mass to be reacted is freed from water.

5. A process for the preparation of at least one of a diaryl sulfide, a di(alkaryl) sulfide and aryl alkaryl sulfide by reacting at an elevated temperature at least one of an aryl halide and an alkaryl halide with an alkali metal bisulfide in a reaction medium comprising a polar organic compound which is a substantial solvent for the reactants and which is essentially stable at the reaction conditions wherein prior to the reaction the mass to be reacted is freed from water, said reaction medium being selected from N-methyl-2-pyrrolidone
pyrrolidone
caprolactam
N-ethylcaprolactam
sulfolane
dimethylacetamide
tetramethylurea
hexamethylphosphoramide
N,N′-ethylenedipyrrolidone the ratio of said halide to said bisulfide being in the approximate range 0.5:1–5:1.

6. A process for the production of at least one of a diaryl sulfide, a di(alkaryl) sulfide and aryl alkaryl sulfide by a reaction at a temperature of the range of from about 125° C. to about 450° C. of at least one of an aryl halide and an alkaryl halide with an alkali metal bisulfide in a polar organic compound reaction medium which is a substantial solvent for the reactants and which is essentially stable at the reaction conditions, said reaction being conducted under substantially anhydrous conditions, said reaction medium being selected from N-methyl-2-pyrrolidone
pyrrolidone
caprolactam
N-ethylcaprolactam
sulfolane
dimethylacetamide
tetramethylurea
hexamethylphosphoramide
N,N′-ethylenedipyrrolidone the ratio of said halide to said bisulfide being in the approximate range 0.5:1–5:1.

7. A process for the preparation of at least one of a diaryl sulfide, a di(alkaryl) sulfide and an aryl alkaryl sulfide by reacting at least one of an aryl halide and an alkaryl halide with an alkali metal bisulfide formed in situ in a polar organic compound which is a substantial solvent for the reactants and which is essentially stable at the reaction conditions by reacting therein hydrogen sulfide and an alkali metal hydroxide, the reaction with the alkali metal bisulfide being effected at an elevated temperature and a sulfide thus formed being recovered from the reaction mass thus obtained, said reaction medium being selected from N-methyl-2-pyrrolidone
pyrrolidone
caprolactam
N-ethylcaprolactam
sulfolane
dimethylacetamide
tetramethylurea
hexamethylphosphoramide
N,N'-ethylenedipyrrolidone the ratio of said halide to said bisulfide being in the approximate range 0.5:1–5:1.

8. A process involving steps as follows: forming a solution of an alkali metal bisulfide in a polar organic compound reaction medium at a temperature below about 130° C., admixing said solution with at least one of an aryl halide and an alkaryl halide, then reacting said bisulfide and said halide at an elevated temperature, and then recovering a sulfide thus formed from the reaction mass thus obtained, said compound being a substantial solvent for the reactants and being essentially stable at the reaction conditions under which said sulfide is formed, said reaction medium being selected from N-methyl-2-pyrrolidone
pyrrolidone
caprolactam
N-ethylcaprolactam
sulfolane
dimethylacetamide
tetramethylurea
hexamethylphosphoramide
N,N'-ethylenedipyrrolidone the ratio of said halide to said bisulfide being in the approximate range 0.5:1–5:1.

9. A process for the preparation of at least one of a diaryl sulfide, a di(alkaryl) sulfide and an aryl alkaryl sulfide by reacting at an elevated temperature at least one of an aryl halide and an alkaryl halide with an alkali metal bisulfide in a polar organic compound reaction medium selected from N-methyl-2-pyrrolidone
pyrrolidone
caprolactam
N-ethylcaprolactam
sulfolane
dimethylacetamide
tetramethylurea
hexamethylphosphoramide
N,N'-ethylenedipyrrolidone said medium being a substantial solvent for the reactants and being essentially stable at the reaction conditions under which said sulfide is formed, then recovering a sulfide thus formed from the reaction mass thus obtained the ratio of said halide to said bisulfide being in the approximate range 0.5:1–5:1.

10. A process for the preparation of at least one of a diaryl sulfide, a di(alkaryl) sulfide and an aryl alkaryl sulfide by reacting at an elevated temperature at least one of an aryl halide and an alkaryl halide with an alkali metal bisulfide in a polar organic compound reaction medium selected from N-methyl-2-pyrrolidone
pyrrolidone
caprolactam
N-ethylcaprolactam
sulfolane
dimethylacetamide
tetramethylurea
hexamethylphosphoramide
N,N'-ethylenedipyrrolidone 11. A process for the preparation of at least one of a diaryl sulfide, a di(alkaryl) sulfide, and an aryl alkaryl sulfide which comprises reacting at least one of an aryl halide and an alkaryl halide with an alkali metal bisulfide in a reaction medium comprising a polar organic compound which is a solvent for the reactants selected from N-methyl-2-pyrrolidone
pyrrolidone
caprolactam
N-ethylcaprolactam
sulfolane
dimethylacetamide
tetramethylurea
hexamethylphosphoramide
N,N'-ethylenedipyrrolidone and which medium is stable at the reaction conditions which include an elevated temperature in the approximate range 175–350° C., the reaction taking place being as follows:

$$2RX + 2MSH \rightarrow R-S-R + 2MX + H_2S$$

wherein each R is a member selected from the group consisting of aryl and alkaryl radicals containing from 6 to 18 carbon atoms, inclusive, X is a halogen selected from the group consisting of chlorine, bromine, fluorine and iodine, and M is an alkali metal selected from the group consisting of sodium, potassium, lithium, rubidium and cesium the ratio of said halide being in the approximate range 1:1–3:1.

12. A process for the production of at least one of a diaryl sulfide, a di(alkaryl) sulfide and aryl alkaryl sulfide which comprises a reaction at a temperature in the range of from about 125° C. to about 450° C. of at least one of an aryl halide and an alkaryl halide with an alkali metal bisulfide in a polar organic compound reaction medium which is a substantial solvent for the reactants and which is essentially stable at the reaction conditions, said reaction being conducted under substantially anhydrous conditions, said medium being selected from N-methyl-2-pyrrolidone
pyrrolidone
caprolactam
N-ethylcaprolactam
sulfolane
dimethylacetamide
tetramethylurea
hexamethylphosphoramide
N,N'-ethylenedipyrrolidone the ratio of said halide to said bisulfide being in the approximate range 0.5:1–5:1.

References Cited

FOREIGN PATENTS 553,518  2/1958  Canada.

OTHER REFERENCES

Houben-Weyl: Methoden der Organischen Chemie, vol. 9, pp. 7 and 98 (1955).

Ephraim: Inorganic Chemistry, 4th edition, p. 524, (1947).

CHARLES B. PARKER, *Primary Examiner.*

D. R. PHILLIPS, *Assistant Examiner.*